United States Patent [19]

Ono et al.

[11] Patent Number: 4,818,107

[45] Date of Patent: Apr. 4, 1989

[54] SYSTEM FOR MEASURING THE POSITION OF A MOVING BODY

[75] Inventors: Toyoichi Ono, Hiratsuka; Yoshihisa Ono, Hadano; Yasuhiko Ichimura; Shoichi Sakanishi, both of Hiratsuka, all of Japan

[73] Assignee: Kabushiki Kaisha Komatsu S eisakusho, Japan

[21] Appl. No.: 157,504

[22] PCT Filed: May 21, 1987

[86] PCT No.: PCT/JP87/00325

§ 371 Date: Nov. 30, 1987

§ 102(e) Date: Nov. 30, 1987

[87] PCT Pub. No.: WO87/07368

PCT Pub. Date: Dec. 3, 1987

[30] Foreign Application Priority Data

May 21, 1986 [JP] Japan ................. 61-116858
Jul. 4, 1986 [JP] Japan ................. 61-155950
Nov. 28, 1986 [JP] Japan ................. 61-284006

[51] Int. Cl.[4] ............................................. G01B 11/00
[52] U.S. Cl. ................................... 356/375; 340/988; 356/152
[58] Field of Search ............... 356/1, 152, 373, 375, 356/376; 340/988–992, 995; 73/146

[56] References Cited

U.S. PATENT DOCUMENTS 4,685,806 8/1987 Arnberg ................. 356/376

FOREIGN PATENT DOCUMENTS 141964  5/1985 European Pat. Off. ........... 356/1
52-1521  4/1973 Japan .
51-53057 4/1976 Japan .
55-117910 9/1980 Japan .
58-25206 5/1983 Japan .
59-180422 10/1984 Japan .

Primary Examiner—F. L. Evans
Attorney, Agent, or Firm—Welsh & Katz, Ltd.

[57] ABSTRACT

In the present invention, a first and a second projector means projecting rotating laser beams rotating at a predetermined period are disposed at two predetermined fixed points, respectively. A first, a second and a third photodetection means are disposed on a moving body to detect the photodetection timings with which laser beams are detected, and to detect photodetection height positions of the rotating laser beams. The rotating angles of the two rotating laser beams from the reference azimuth are calculated on the basis of the outputs from the first, second and third photodetection means, and the positions and heights of the respective photodetection means are calculated from these data. Thus are the position and attitude angle of the moving body are measured with high accuracy, and these data are displayed on a real-time basis. In order to measure the rotating angles of the two rotating laser beams from the reference azimuth with high accuracy, two photodetection means are disposed on a straight line connecting the first and second projector means to thereby detect the respective reference azimuths of the rotating laser beams with high accuracy, to thereby improve the position measuring accuracy.

6 Claims, 14 Drawing Sheets

SYSTEM FOR MEASURING THE POSITION OF A MOVING BODY

TECHNICAL FIELD

The present invention relates to a system which measures the position of a moving body in a work area using rotary laser beams, and more particularly to a system which measures the postion of the moving body in accordance with the principles of triangulation by scanning the work area with the laser beams from two rotary laser projectors installed in the work area.

BACKGROUND TECHNIQUE

Conventionally, Japanese Published Unexamined Patent Application No. 180422/1984 (travel locus analyzing system) is named as disclosing a system which measures and utilizes the 3-dimensional position of a vehicle in order to support the driving of a work vehicle and automate the work in a building site.

This system samples the travel speed, longitudinal tilt angle, lateral tilt angle and azimuth of the moving vehicle at fixed infervals and calculates the current position of the vehicle on the basis of the sampled values at fixed intervals.

This conventional system accumulates the quantities of relative movement of the vehicle and calculates the current position of the vehicle, so that it has the problem that an accumulated error may be involved in the current position of the vehicle due to the roughness of the road, the wheel slippage or errors in the sampled values to thereby lower the accuracy with which the position of the vehicle is measured.

Systems are proposed which measure the position of a moving body in accordance with the principles of triangulation by scanning the work area with laser beams from two rotary laser projectors installed in the work area in order to measure the 3-dimensional position of a vehicle.

One of the systems is disclosed, for example, in Japanese Published Examined Patent Application No. 1521/1977, in which the difference between the time when the laser beam from each of two rotary laser projectors crosses the reference azimuth connecting the two projectors and the time when the laser beam from that projector crosses the azimuth of the moving body are measured, the angle between both the azimuths are calculated and the principles of triangulation is applied.

This system uses a common reference azimuth signal on the assumption that the rotations of the two projectors are synchronized with high accuracy. Actually, it has the difficulty that it cannot avoid the generation of an error in the rotational synchronism of the two projectors due to unequal characteristics of the rotational drivers of the projectors and a change of the environment, so that the accuracy with which the position of the moving body is measured is greatly degraded.

In utilizing the measured data, a method is often employed which displays the current position of a moving body on a map and controls the vehicle travel on the basis of this display.

Conventionally, almost all of the position display means used for control in a travel control system for a moving body, such as a vehicle, includes a map sheet including a transparent sheet with a map printed thereon, attached on a display screen or a projector or the like to display a microfilm map, to thereby display terrain information thereon and plot (or trace) the position information obtained from a gyro sensor, loran or the like on the terrain information.

It is assumed in such position display means that a terrain does not change at all, so that the position display means has the problem that it cannot be used at all for an hourly changing terrain such as a construction site where the ground is being levelled.

The present invention has been made in view of the above real situation. It is an object of the present invention to provide a position measuring apparatus which is capable of measuring with high accuracy the 3-dimensional position and attitude angle of a moving body, such as a vehicle, on a real-time basis, even in a construction site where the shape of the work area surface changes very often.

DISCLOSURE OF THE INVENTION

In order to achieve the above objects, the present invention is characterized by first and second projector means installed at two preset fixed positions for projecting rotating laser beams, respectively, rotating at a fixed period; first, second and third photodetection means disposed on a vehicle for sensing the photodetection timings with which laser beams are detected and photodetection height positions of the rotating laser beams; rotating angle calculating means for calculating first and second rotating angles of the rotating laser beams from the first and second projector means upon detection of the laser beams on the basis of the photodetection timings detected by the first photodetection means, third and fourth rotating angles of the rotating laser beams from the first and second projector means upon detection of the laser beams on the basis of the photodetection timings detected by the second photodetection means, and fifth and sixth rotating angles of the rotating laser beams from the first and second projecting means upon photodetection of the laser beams on the basis of the photodetection timings detected by the third photodetector means; first calculating means for calculating a first, a second and a third coordinate positions, on a certain x-y-z-coordinate system, of the respective photodetection positions in the first, second and third photodetection means on the basis of the set spacing between the first and second projector means, and the first and second rotating angles, third and fourth rotating angles and fifth and sixth rotating angles, calculated by the rotating angle calculating means; and second calculating means for calculating the longitudinal tilt angle, lateral tilt angle and azimuth of the vehicle on the basis of the respective spacings among the first, second and third photodetection means, the photodetection height positions detected by the respective photodetection means and the first, second and third coordinate positions calculated by the first calculating means.

Preferably, the present invention is characterized by third calculating means for calculating the x-y-coordinate position of a point representative of the vehicle on the basis of at least one of the photodetection height positions sensed by the first, second and third photodetection means, at least one of the x-y-coordinate positions calculated by the first calculating means, and the longitudinal tilt angle, lateral tilt angle and azimuth of the vehicle calculated by the second calculated means; and fourth calculating means for calculating the z-coordinate position of the point representative of the vehicle on the basis of the z-coordinate position of the rotating laser beams, at least one of the photodetection height positions detected by the first, second and third photodetection means, and the longitudinal tilt angle and lateral tilt angle of the vehicle calculated by the second calculating means.

Namely, first, when the first photodetection means detects the respective rotary laser beams from the first and second projector means, the first x-y-coordinate position, on the x-y-z-coordinate system, of the photodetection position in the first photodetection means is calculated in accordance with the principles of triangulation on the basis of the spacing between the installed first and second projector means and the first and second rotational angles of the rotary laser beams. Similarly, the respective x-y-coordinate positions of the second and third photodetection positions in the second and third photodetection means are calculated.

The x-y-coordinate position of a point representative of the vehicle is calculated on the basis of at least one of the first, second and third x-y-coordinate positions and the calculated attitude angle of the vehicle. The z-coordinate position of the point representative of the vehicle is calculated on the basis of the z-coordinate position of the rotary laser beams, at least one of the photodetection height positions sensed by the first, second and third photodetection means and the attitude angle of the vehicle (in this case, excluding the azimuth).

In order to correct an error due to the two rotating laser beams being out of rotational synchronism, an apparatus for measuring the position of a moving body according to the present invention comprises first and second projector means disposed at two predetermined fixed points for generating a first and second rotating laser beams rotating at a predetermined period; first and second photodetection means disposed on a straight line connecting the first and second projector means for detecting the laser beams from the first and second projector means, respectively; and third photodetection means disposed on the moving body; wherein the first rotating angle of the first rotating laser beam relative to the straight line is calculated from the difference between the photodetection timings with which the first and third photodetection means have received the laser beams and the rotational period of the first projector means; and the second rotating angle of the second rotating laser beam relative to the straight line is calculated from the difference between the photodetection timings with which the second and third photodetection means have detected the laser beams, the difference between the photodetection timings with which the second and third photodetection means have received the laser beams, and the rotation period of the second projector means; and the position of the moving body is measured using triangulation from the distance between the two fixed points, and the first and second rotating angles. Thus, high-accuracy position measurement is achieved without being influenced by an error due to the rotating laser beams being out of rotational synchronism.

In addition, in order to perform a correct position display even when the terrain changes at any moment, a vehicle-mounted display apparatus according to the present invention includes 3-dimensional position measuring means for sensing the position of the moving body; means for calculating a terrain on the basis of the position information from the 3-dimensional position measuring means; memory means for storing terrain information; and display means for rewriting the map on the display screen on a real-time basis on the basis of the terrain information and indicating the current position of the moving body.

According to such apparatus, the terrain information is calculated at any time on the basis of the position information from the 3-dimensional position measuring means and stored, so that it is rewritten in accordance with a change in the terrain and displayed on the display screen. Therefore, correct position display is achieved even if the terrain may change every moment.

BEST MODE FOR CARRYING OUT THE INVENTION

In order to describe the present invention in detail, the present invention will now be illustrated with reference to the accompanying drawings.

First, a method of measuring the 3-dimensional position, etc., of a vehicle according to the present invention will basically be described.

Figure 2:
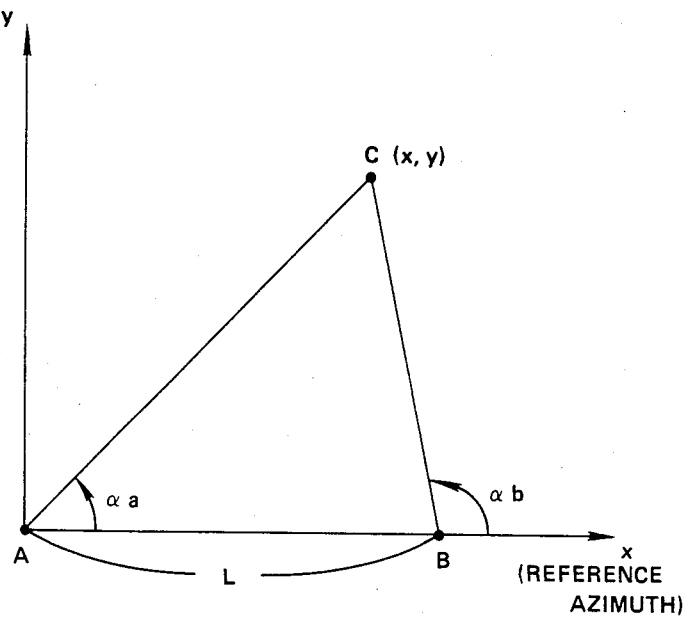
FIGS. 2–5 are views used for explaining the position measuring method according to the present invention.

In FIG. 2, if the distance between points A and B is represented by L, the angle between the x-axis and a segment of line AC by $\alpha_a$, and the angle between the x-axis and a segment of line BC by $\alpha_b$, the x-y coordinates of a point C will then be given by $$x = L \frac{\sin \alpha_b \cdot \cos \alpha_a}{\sin (\alpha_b - \alpha_a)} \quad (1)$$

$$y = L \frac{\sin \alpha_b \sin \alpha_a}{\sin (\alpha_b - \alpha_a)}$$

In the present invention, when $\alpha_a$, $\alpha_b$ are to be calculated, a projector which projects a rotary laser beam is installed at each of points A and B and a photodetection device is mounted on the vehicle. When the photodetection device detects the respective rotary laser beams, the respective angles $\alpha_a$, $\alpha_b$ are sensed.

Figure 3:
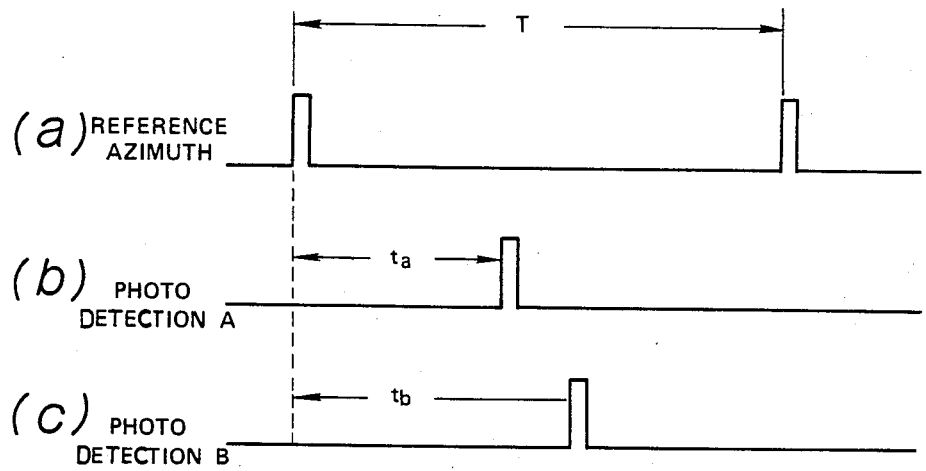

As shown in FIG. 3, the rotational angles $\alpha_a$, $\alpha_b$ are calculated by the following formulas $$a_a = 2\pi \frac{t_a}{T}, \quad a_b = 2\pi \frac{t_b}{T} \tag{2}$$

where T is the period of the rotary laser beams (FIG. 3(a)), and $t_a$ and $t_b$ (FIGS. 3(b) and (c)) are the time intervals taken from the time when the respective rotary laser beams from the projectors installed at the positions A and B reach the reference azimuth (x-axis direction) to the times when the laser beams enter the vehicle-mounted photodetection unit.

The x-y-coordinates calculated by the formula (1) are the ones of the position in the vehicle-mounted detection device where the laser beams are detected and not the coordinates of the point representative of the vehicle. In order to transform the coordinates of the laser beam detection point to the coordinates of the point representative of the vehicle, the attitude angle of the vehicle (the longitudinal tilt angle, lateral tilt angle and azimuth of the vehicle) is calculated.

How to calculate the attitude angle will now be described.

Figure 4:
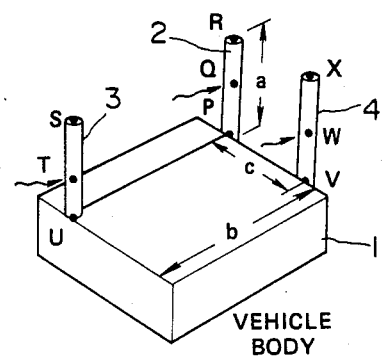
Figure 5:
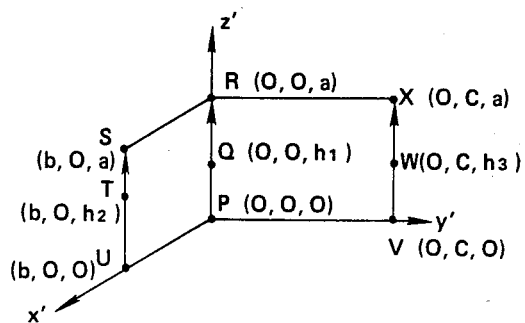

First, as shown in FIG. 4, the vehicle body 1 and photodetection units 2, 3 and 4 are modeled for considering purposes. The coordinate positions, on a x'-y'-z'-coordinate system, of the respective points, shown in FIG. 4, on the vehicle body are shown in FIG. 5 where the point P is the origin of the x'-y'-z'-coordinate system and the longitudinal tilt angle $\theta$, lateral tilt angle $\delta$ and azimuth $\psi$ of the vehicle are all 0. Points Q, T and W are the laser beam detection points at the photodetection units 2, 3 and 4.

When the attitude angle of the vehicle body changes, the moved positions $(x'_q, y'_q, z'_q)$, $(x'_t, y'_t, z'_t)$ and $(x'_w, y'_w, z'_w)$ of the points Q, T and W on the x'-y'-z' coordinate system are represented by $x'_q = h_1 \cos\delta \sin\theta \cos\psi - h_1 \sin\delta \sin\psi$ $y'_q = h_1 \cos\delta \sin\theta \sin\psi - h_1 \sin\delta \cos\psi$ $z'_q = h_1 \cos\delta \cos\theta \tag{3}$ $y'_t = h_2 \cos\delta \sin\theta \cos\psi + b \cos\theta \cos\psi$ $y'_t = h_2 \cos\delta \sin\theta \cos\psi + b \cos\theta \sin\psi$ $y'_t = h_2 \cos\delta \cos\theta - b \sin\theta \tag{4}$ $x'_w = -(c \cos\delta + h_3 \sin\delta) \sin\psi - (c \sin\delta - h_3 \cos\delta) \sin\theta \cos\psi$ $y'_w = (c \cos\delta + h_3 \sin\delta) \cos\psi - (c \sin\delta - h_3 \cos\delta) \sin\theta \sin\psi$ $z'_w = (c \sin\delta - h_3 \cos\delta) \cos\theta \tag{5}$ Therefore, if the position of the point P on the x-y-z-coordinate system with the point A as the origin in FIG. 2 is $P(x_0, y_0, z_0)$, the positions $(x_q, y_q, z_q)$, $(x_t, y_t, z_t)$ and $(x_w, y_w, z_w)$ of the points Q, T and W on the x-y-z-coordinate system are respresented by $x_q = x'_q + x_0 \tag{6}$ $y_q = y'_q + y_0$ $z_q = z'_q + z_0$ $x_t = x'_t + x_0 \tag{7}$ $y_t = y'_t + y_0$ $z_t = z'_t + z_0$ $x_w = x'_w + x_0 \tag{8}$ $y_w = y'_w + y_0$ $z_w = z'_w + z_0$ If the vertical height (z-axis) of the laser beam plane is $h_0$, $z_q = z_t = z_w = h_0$ First, the lateral tilt angle $\theta$ is calculated.
Eliminating $z_0$ from the formulas (6) and (8), $z'_q = z'_w$ Namely, from the formulas (3) and (5), $h_1 \cos\delta \cos\theta = -(c \sin\delta - h_3 \cos\delta) \cos\theta \tag{9}$ Rewriting the formula (9), $((h_1 - h_3) \cos\delta + c \sin\delta) \cos\theta = 0 \tag{10}$ Since $-\pi/2 < \theta < \pi/2$ in the formula (10), $\cos\theta \neq 0$ Namely, $(h_1 - h_3) \cos\delta + c \sin\delta = \sqrt{(h_1 - h_3)^2 + c^2} \sin(\delta + \omega_1) = 0 \tag{11}$ $= -\omega_1 = -\tan^{-1}\left(\frac{h_1 - h_3}{c}\right) \tag{12}$ The longitudinal tilt angle $\theta$ will now be calculated.
Eliminating $z_0$ form the formula (6) and (7), $z'_q = z'_t$ Namely, from the formulas (3) and (4), $h_1 \cos\delta \cos\theta = h_2 \cos\delta \cos\theta - b \sin\theta \tag{13}$ Rewriting the formulaa (13), $(h_1 - h_2) \cos\delta \sin\theta + b \sin\theta = \tag{14}$ $\sqrt{(h_1 - h_2)^2 \cos^2\delta + b^2} \sin(\theta + \omega_2) = 0$ $\therefore \theta = -\omega_2 = -\tan \frac{-1(h_1 - h_2) \cos\delta}{b} \tag{15}$ The azimuth $\psi$ will now be described.
Eliminating $x_0$ from the formulas (6) and (7), $z_q - x_t = x'_q - x'_t = (h_1 - h_2)\cos\delta \sin\theta \cos\psi - h_1 \sin\delta \sin\psi - b \cos\theta \cos\psi \tag{16}$ Eliminating $y_0$ from the formulas (6) and (7), $$y_q - y_t = y'_q - y'_t = (h_1 - h_2)\cos\delta \sin\theta \sin\psi + \quad (17)$$

$$h_1 \sin\delta \sin\psi - b \cos\theta \sin\psi$$

Eliminating O from the formulas (16) and (17), $$h_1 \sin 0 = (y_q - y_t)\cos\psi - (x_q - x_t)\sin\psi$$
$$= u \sin(\psi + v)$$

where $u = \sqrt{(y_q - y_t)^2 + (y_q - y_t)^2}$ $$\tan v = -\frac{y_q - y_t}{x_q - x_t}$$

Modifying the formula (18), $$\psi = \sin^{-1}\left(\frac{h_1 \sin\delta}{u}\right) - v \quad (19)$$

Namely, the lateral tilt angle, the longitudinal tilt angle O and the azimuth of the vehicle can be obtained from the formulas (12), (15) and (19) using the measured values $h_1$, $h_2$, $h_3$, $(x_q, y_q)$, $(x_t, y_t)$.

When the attitude angle (O, $\delta$, $\psi$) of the vehicle is obtained, the position P $(x_0, y_0, z_0)$ of the point P is given from the formulas (3) and (6) as follows:

$$x_0 = x_q - (h_1 \cos\delta \sin\theta \cos\psi - h_1 \sin\delta \sin\psi)$$

$$y_0 = y_q - (h_1 \cos\delta \sin\theta \sin\psi - h_1 \sin\delta \cos\psi)$$

$$z_0 = z_q - h_1 \cos\delta \cos\theta = h_0 - h_1 \cos\delta \cos\psi \quad (20)$$

Therefore, the position of the point P can be obtained from the formula (20) and the position of the point representative of the point (for example, the center of gravity) having fixed relationship to the point P can be obtained.

Figure 1:
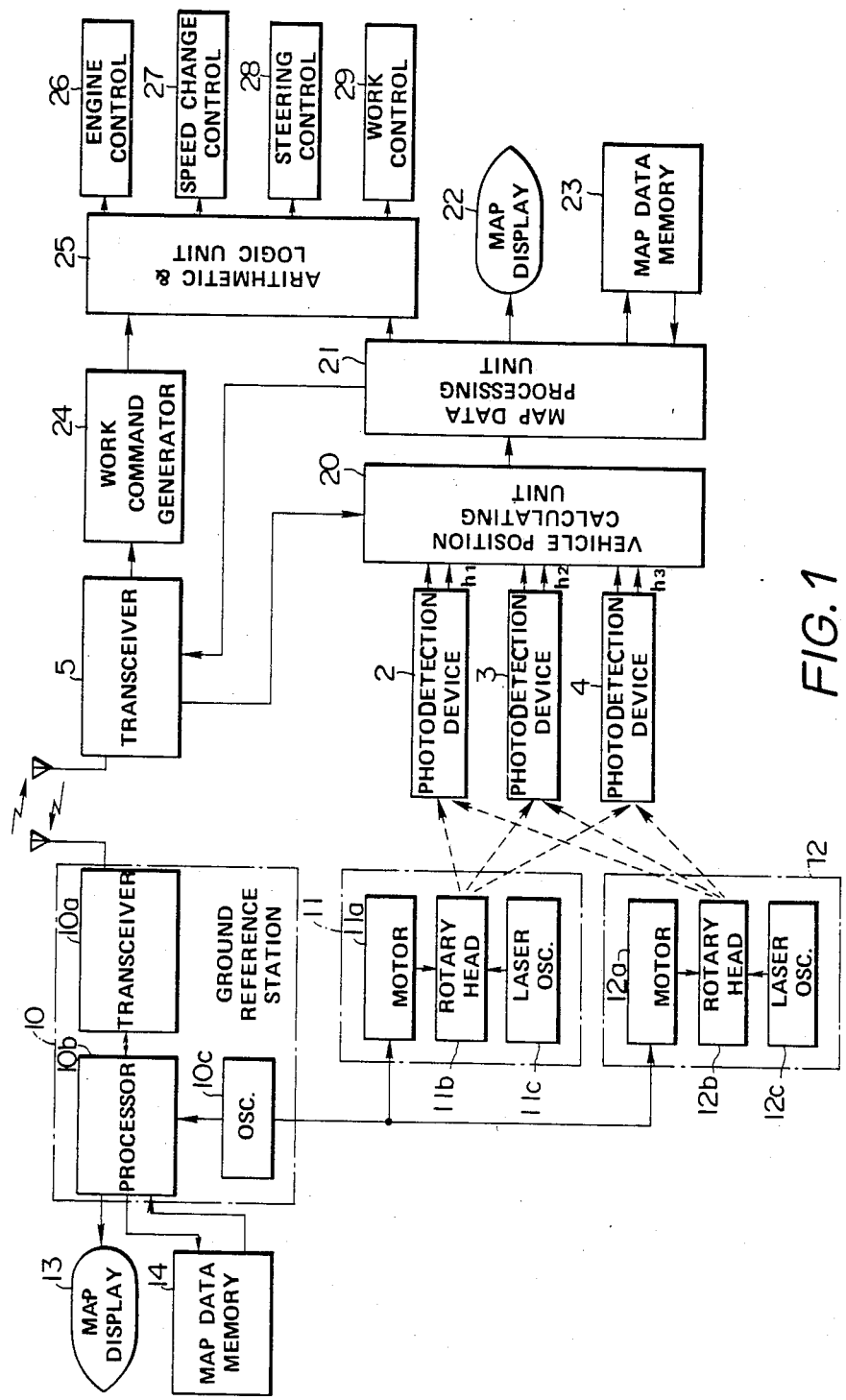
FIG. 1 is a block diagram showing a first embodiment of the present invntion.

FIG. 1 is a block diagram showing one embodiment of the present invention. In FIG. 1, a ground station system is composed of a ground reference station 10, two projectors 11, 12, a map display 13 and a map data memory 14. The station 10 is in turn composed of a tranceiver unit 10a, a processor 10b and an oscillator 10c. The projectors 11 and 12 are composed of pulse motors 11a, 12a; rotary heads 11a, 12b; and laser oscillators 11c, 12c, respectively.

On the other hand, three photodetection devices 2, 3 and 4, a 5 and a device 20 which performs various calculations, processing and control are mounted on the vehicle.

Each of the photodetection devices includes a one-dimensional semiconductor light-spot position sensing device (PSD) disposed normal to the vehicle body at a corresponding predetermined position on the vehicle body, and the PSD is sensing and outputting the position or height of the light-spot and the photodetection timing.

The projectors 11 and 12 are installed at points A and B at a fixed spacing L on the x-y-z-coordinate system, as shown in FIG. 2. The arrangement is such that the planes of the rotary laser beams from the projectors 11 and 12 are parallel to the x-y-plane, and that the height of the plane of each of the laser beams is at a predetermined height $H_0$.

In the projector 11, a continuously oscillated laser beam from the laser oscillator 11c is input to the rotary head 11b, which is rotated by a pulse motor 11a to project the rotary laser beam from the head 11b. The pulse motor 11a rotates synchronously with a clock pulse applied from the oscillator 10c of the ground reference station 10. The projector 12 projects a rotary laser beam similarly to the projector 11. Namely, the rotatinal synchronisms and phases of the rotary heads 11b and 12b coincide with each other.

The processor 10b of the ground reference station 10 detects the time when the laser beams from the projectors 11 and 12 are directed to the reference azimuth (x-axis direction) by a clock pulse from the oscillator 10c at which time the tranceiver 10a generates a reference azimuth signal indicative of the reference azimuth.

When the vehicle-mounted tranceiver 5 receives the reference azimuth signal, it applies the signal to the vehicle position calculating unit 20 which also receives signals indicative of the timings of receiving the rotary laser beams from the photodetection units 2, 3 and 4 and signals indicative of the height positions $h_1$, $h_2$ and $h_3$ of the detected beam. If a means which measures the same time as the ground station oscillator 10c is provided on the vehicle, the timings when the laser beams are directed to the reference azimuth are detected on the vehicle side alone.

The vehicle position calculating unit 20 first calculates the coordinate positions $(x_q, y_q, z_q)$ and $(x_t, y_t, z_t)$ of the photodetection positions Q and T of the respective photodetection units on the basis of the formulas (1) and (2). It is to be noted that $z_q = x_t = h_0$. Next, the lateral tilt angle of the vehicle is calculated by substituting the input photodetection height positions $h_1$ and $h_3$ into the formula (12). The longitudinal tilt angle $\theta$ of the vehicle is calculated by substituting the angle $\delta$ and the input photodetection height positions $h_1$, $h_2$ into the formula (15). The azimuth $\psi$ is calculated by substituting the tilt angle, the calculated $(x_q, y_q)$, $(x_t, y_t)$ and the photodetection height position $h_1$ into the formula (19).

Subsequently, the 3-dimensional position of the point representative of the vehicle is calculated on the basis of the photodection positions $Q(x_q, y_q, z_q)$, $T(x_t, y_t, z_t)$ and the attitude angle $(\theta, \delta, \psi)$ calculated as described above. The position $P(x_0, y_0, z_0)$ of the point P where the photodetection unit 2 is mounted on the vehicle can be calculated by substituting the $(x_q, y_q, z_q)$ and $(\theta, \delta, \psi)$ into the formula (12).

A signal indicative of 3-dimensional position of the point representative of the vehicle thus calculated is applied to the map data processing unit 21, which updates the vehicle travel locus and terrain data on the basis of one-day map data from the map data memory 23 to form new map data.

For example, the area (work area) where the vehicle travels can be divided into a limited number of subareas (n×n) in the x- and y-directions as shown in Table 1 and a memory which has the respective subarea positions as addresses may be provided. When the point representative of the vehicle arrives at a position in the limited number of subareas, the z-coordinates is written in the location in the memory, corresponding to that position to thereby cause map data on the 3-dimensional travel locus to be stored there.

TABLE 1

| $x^y$ | $y_0$ | $y_1$ | $y_2$ | ... | $y_n$ |
|---|---|---|---|---|---|
| $x_0$ | $z_{00}$ | $z_{01}$ | $z_{01}$ | | $z_{0n}$ |

TABLE 1-continued

| $x^y$ | $y_0$ | $y_1$ | $y_2$ | ... | $y_n$ |
| --- | --- | --- | --- | --- | --- |
| $x_1$ | $z_{10}$ | $z_{11}$ | $z_{12}$ | | |
| $x_2$ | $z_{20}$ | $z_{21}$ | $z_{22}$ | | |
| $x_n$ | $z_{n0}$ | | | | $z_{nn}$ |

When the already written z-coordinates are arrived at, they are updated with the latest z-coordinates. If the point representative of the vehicle is assumed to be a point set on the ground, the 3-dimensional travel locus data stored as described above can be regarded as terrain data.

Figure 6:
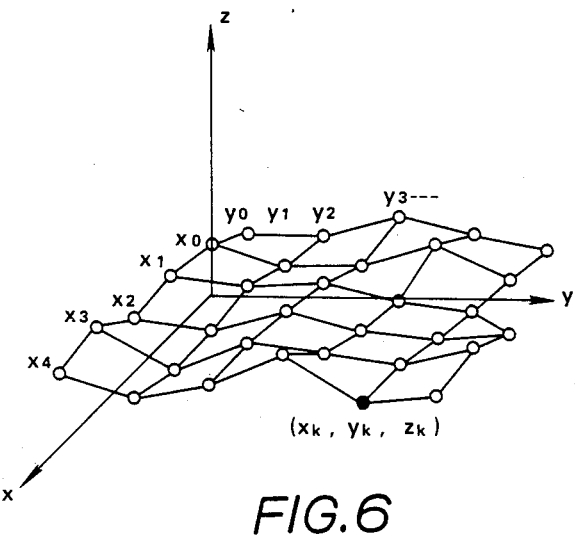
FIG. 6 is a view showing an example of display by a map display in FIG. 1.

The map data processing unit 21 displays the travel locus of the vehicle or the terrain on the map display 22 on the basis of the map data stored in the map data memory 23. FIG. 6 shows one example of map display. Of course, the current position of the vehicle may be displayed on the map.

The vehicle-mounted tranceiver 5 transmits map data stored in the map memory while the tranceiver 10a of the ground reference station 10 receives the data and applies it to the processing unit 10b, which stores the input map data in the map data memory 14 and displays the travel locus of the vehicle or the terrain on the map display 13 on the basis of the stored map data.

Scheduled work contents are set in a work command generator 24. An arithmetic and logic unit 25 modifies an engine control signal, a speed change control signal, a steering control signal and a work implement control signal to control an engine control unit 26, a speed change control unit 27, a steering control unit 28 and a work implement control unit 29 on the basis of a signal indicative of the work content applied by the work command generator, data (map data, vehicle position data, attitude angle data) applied by the map data processing unit 21.

The above system may constitute a completed system for a construction work which performs remote control, etc., of the vehicle by communicating with the ground station 10 concerning vehicle position data and terrain data obtained on a real-time basis.

As described above, according to the inventive system, the 3-dimensional position of the vehicle can be obtained with high accuracy and on a real-time basis without accumulation of measurement errors even on an unlevelled ground such as a construction site. The system also can provide high-accuracy vehicle position information and terrain information to the operator to aid his work.

A preferable form of a second embodiment of a vehicle-mounted display apparatus according to the present invention will now be described.

Figure 7:
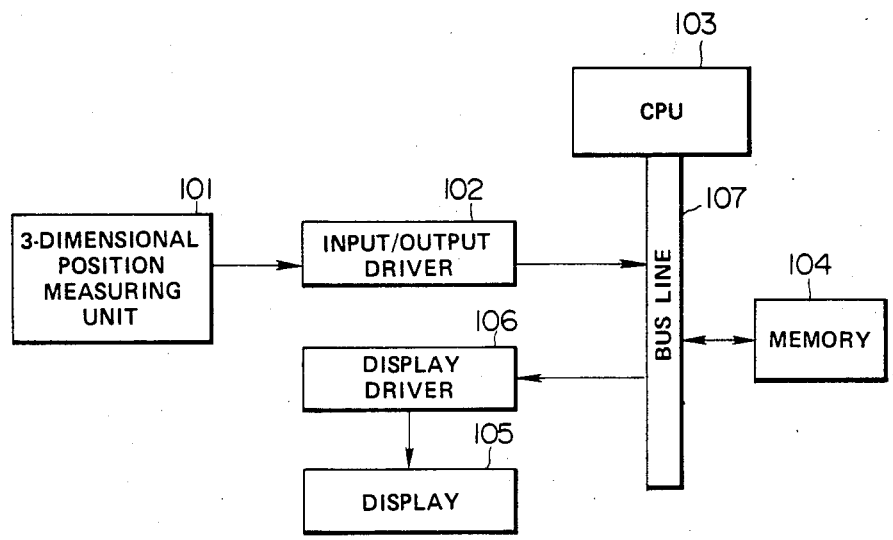
FIG. 7 is a block diagram of a vehicle-mounted display device of a second embodiment of the present invention.

The vehicle-mounted display apparatus of the embodiment of the present invention is characterized in that the map be rewritten at any moment. As shown in block diagram in FIG. 7, the apparatus includes a central processing unit (CPU) 103 which calculates 3-dimensional position measurement information via a 3-dimensional position measuring unit 101 comprising a GSP (Global Positioning System) receiver and an input/output driver 102, a memory 104 which stores the calculated terrain information, a display 105 comprising a CRT displaying the terrain information as a map, a display driver 106 and a bus line 107 connecting the respective units for data transmission.

Figure 8A:
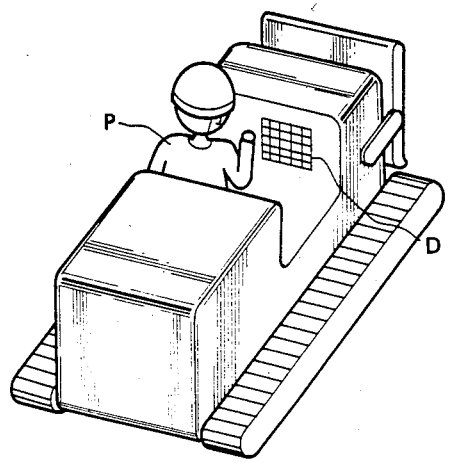
FIGS. 8(a), and (b) are views showing te vehicle-mounted display device installed on a bulldozer on a site where the ground is levelled.
Figure 8B:
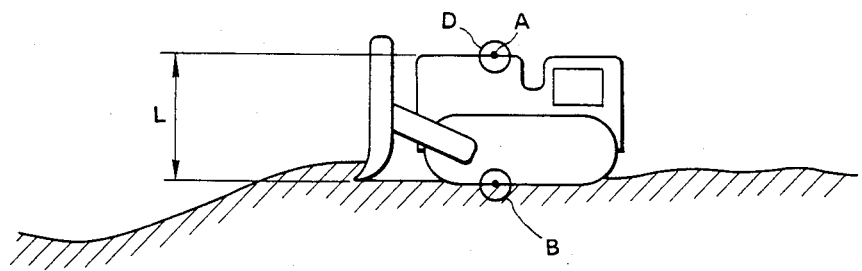

The vehicle-mounted display unit D is installed on the dashboard of a bulldozer used in a site where the ground is levelled so as to be seen by the operator P, as shown in FIG. 8(a). As shown in a side view in FIG. 8(b), if the vehicle-mounted display unit D is installed at a point A, the positional coordinates $(x_0, y_0, z_0)$ given by the 3-dimensional position measuring unit represents the position of the point A, so that the coordinates of a point B on the caterpillar tread is represented by $(x_0, y_0, z_0-L)$ if the height L to the B is measured in advance. Since the caterpillar tread is in contact with the ground surface at the point B, CPU 103 handles the coordinates of the point B as coordinates on the ground surface and performs an arithmetic operation at intervals of 0.1 second on the basis of the data.

Figure 9:
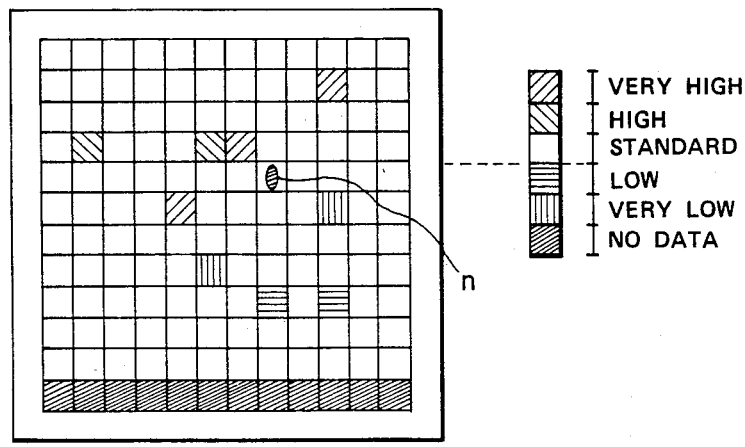
FIG. 9 is a view showing one example of a picture displayed on the display device.

As shown in FIG. 9, the display screen of the display unit is arranged to be divided into meshes, each being 1.5 m long×1 m wide, and each mesh is arranged to display one of five different heights in the corresponding pattern.

A portion with no terrain data is displayed by blacking the corresponding mesh.

The operation of the vehicle-mounted display apparatus will now be described.

If the travel speed of the bulldozer is 2 m/s (=7.2 km/h), five pieces of terrain data are obtained as the bulldozer travels 1 m because terrain data is calculated at intervals of 0.1 second. In this way, the height components (z-coordinates) of the terrain data on each mesh are averaged and rewritten at the address in the memory corresponding to the mesh as the height (of the central coordinates) of the mesh. The data on this height is written into the memory as a digital signal on the basis of a predetermined threshold value.

Figure 10:
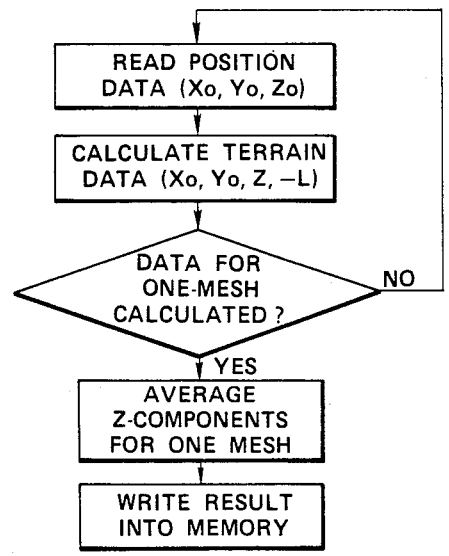
FIG. 10 is a flowchart showing the operation of a CPU of the display device.

The flowchart of this operation is shown in FIG. 10.

CPU 103 accesses the terrain data written into the memory when the vehicle has passed the same place the last time and displays the data on the display screen of the display unit 105. The character n represents the current position. Terrain data changing when the vehicle passes the terrain this time is rewritten as new data at the corresponding address in the memory as occasion arises.

In this way, a correct terrain map and the display position can be displayed even when the terrain changes at any moment.

Figure 11:
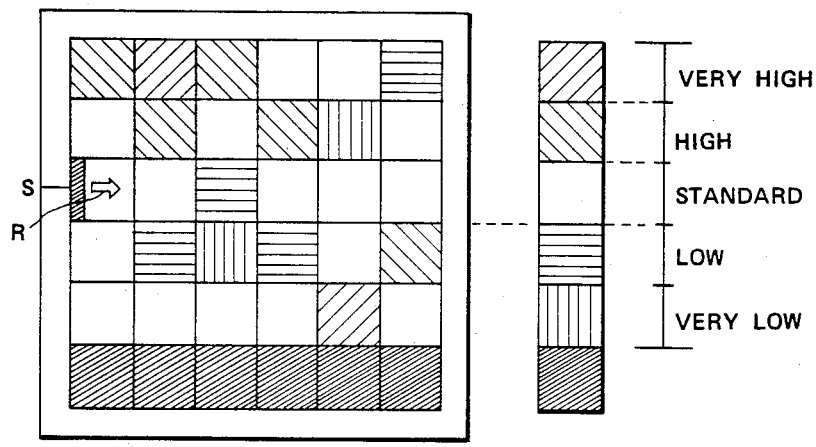
FIG. 11 is a view showing a modification of the displayed picture.

While in this embodiment the entire work area is displayed on the display screen, as seen in FIG. 11, it may be arranged so that the current position S of the vehicle is displayed stationary at the left end of the screen, the travel line R is set horizontal, and the screen is scrolled as the vehicle travels.

While in the second embodiment, different heights are displayed in corresponding patterns, they may, of course, be displayed in corresponding colors or gradations. The display of the height is not required to be made in 5 stages. For example, it may be made in 10 stages.

While the CRT has been used as the display 105, a graphic display panel such as a liquid crystal or a plasma display may be used. In addition, the 3-dimensional position measuring unit is not limited to the GPS and other devices may be used, of course.

Like this, according to the vehicle-mounted display apparatus of the second embodiment of the present invention, when the position of the moving body is to be displayed on a map, the 3-dimensional position of the moving body is calculated, the map is re-constructed in accordance with terrain data rewritten on the basis of the position data as occasion arises, and the current position of the moving body is displayed on the map, so that the apparatus may be used as effective display means even when the terrain changes at any moment.

A position measuring apparatus of a third embodiment of the present invention which has a function of correcting a deviation between the reference azimuths due to the rotary laser beams being out of synchronism will now be described.

Figure 12:
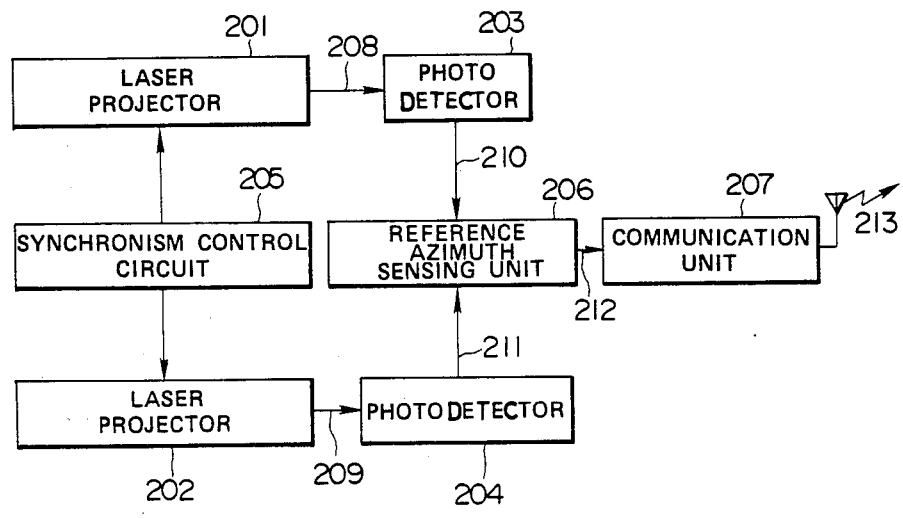
FIG. 12 is a block diagram showing the structure of a position measuring apparatus according to a third embodiment.
Figure 13:
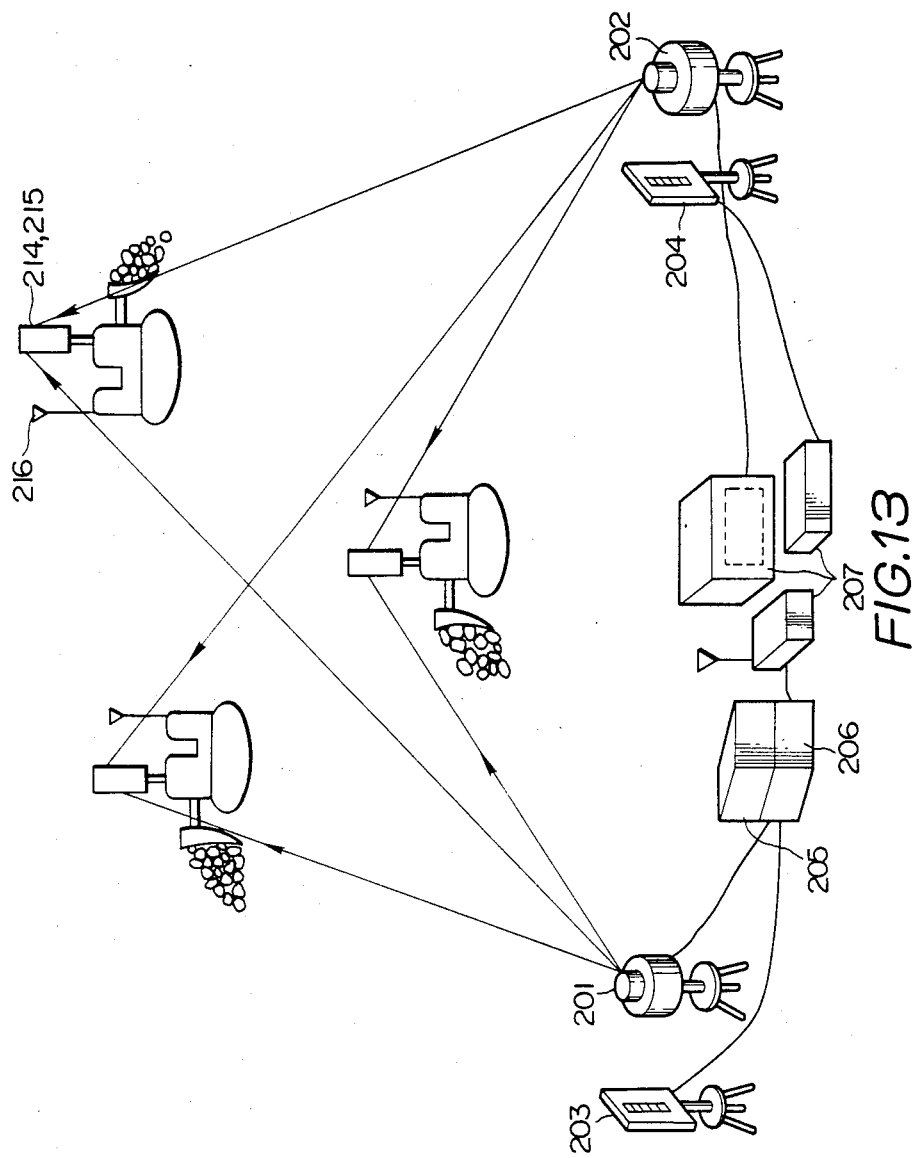
FIG. 13 is a view showing the positional relationship between a moving vehicle and two laser beam projectors.
Figure 14:
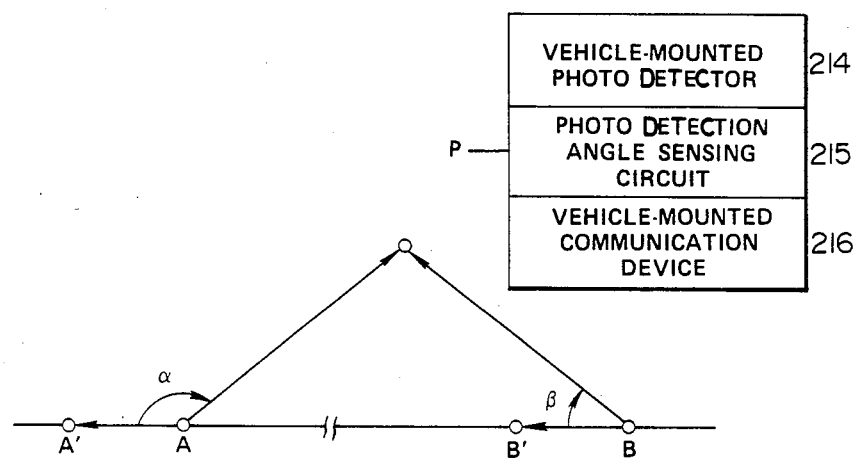
FIG. 14 is a view showing FIG. 13 illustratively.

FIG. 12 shows, in a block diagram, the structure of the laser beam projector of the position measuring apparatus. FIG. 13 shows the relationship between the laser beam projectors and moving vehicle P. FIG. 14 illustrates FIG. 13.

This position measuring apparatus includes a laser beam projecting unit which in turn includes first and second projectors 201 and 202 installed at two fixed points A and B, respectively, so that laser beams 208 and 209 are rotated periodically at low speed by driving of rotary prism heads (not shown) by a synchronism control circuit 205; first and second photodetection units 203 and 204 disposed at positions A' and B' on a straight line a, b connecting the projectors 201 and 202; a reference azimuth sensing circuit 206 which senses the azimuths or reference azimuth sensing timings C1 and C2 of the photodetectors 203 and 204 from the outputs of the photodetector 203 and 204 and calculates a reference azimuth sensing timing signal on the basis of the timing C1 and C2 and a reference position correction signal from the deviation between those timings C1 and C2; and a communication unit 207; and a moving vehicle P which has a vehicle-mounted photodetection unit 214 for sensing the laser beams 208 and 209; a vehicle-mounted communication device 216 for receiving the output signal from the communication unit 207; a photodetection angle sensing circuit 215 for sensing the photodetection angle from the outputs of the communication unit 216 and the vehicle-mounted photodetector; and a calculatin circuit (not shown) for sensing the photodetection position from the photodetection angle using trigonometry.

Figure 15:
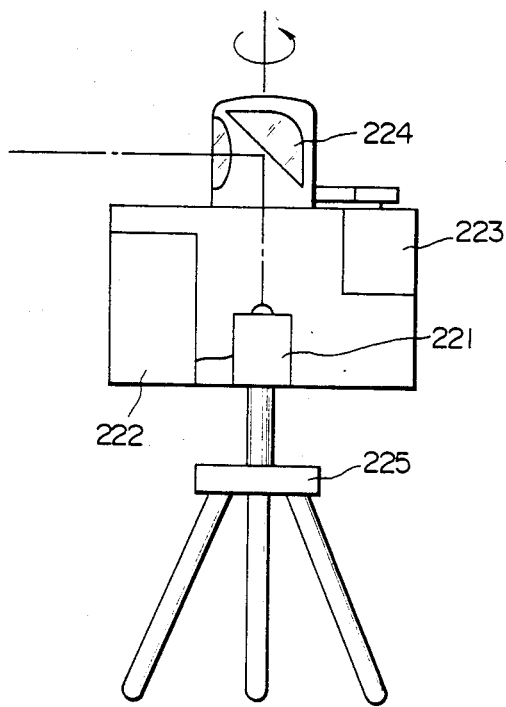
FIG. 15 is a view showing a laser beam projector of the position measuring apparatus.

As shown in FIG. 15, the first and second laser projectors are each composed of a laser oscillator 221 controlled by an oscillator control circuit 222, a prisma-head rotating motor 223 controlled by the synchronism control circuit 205, and a rotary prisma-head 224 so as to rotate the laser beams at a predetermined speed.

Figure 16:
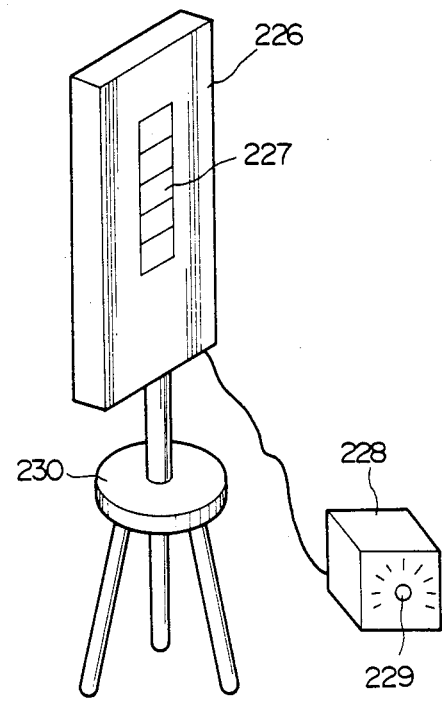
FIG. 16 is a view showing a photodetector of the apparatus.

As shown in FIG. 16, the first and second photodetectors 203 and 204 are each arranged such that photodetection face of its photodetection element 227 detects a laser beam, and that a photodetection sensing circuit 228 displays that on its photodetection monitor 229, and they output signals to the reference azimuth sensing circuit 206. Reference numeral 230 denotes an elevator type tripod which adjusts the height of the photodetection face.

Figure 17:
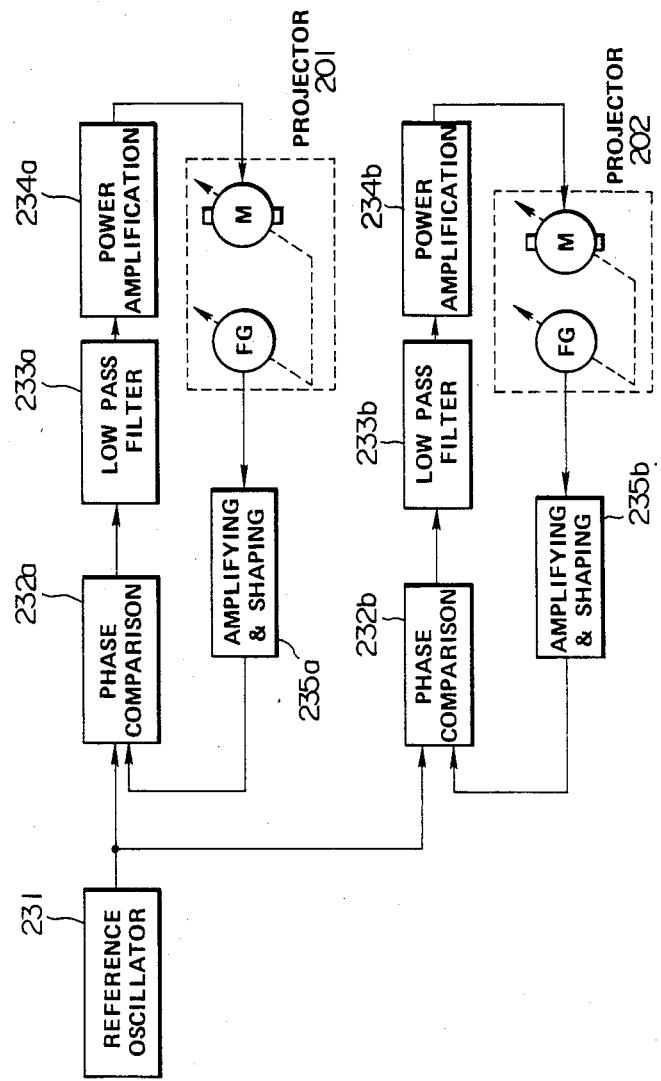
FIG. 17 is a view showing a synchronism control circuit of the apparatus.

As shown in FIG. 17, the synchronism control circuit 205 is composed of a reference oscillator 231; phase comparators 232a, 232b; low pass filters 233a, 233b; power amplifiers 234a, 234b; and amplifying shapers 235a, 235b. It synchronously rotates the prisma-head rotating motors 223 of the first and second laser projectors 201 and 202 to synchronize the rotations of the two laser beams.

The operation of the position measuring apparatus will now be described.

First, the first and second laser projectors 201 and 202 emit two laser beams 208 and 209 which synchronously rotate in the same direction with the two respective fixed points A and B as the centers by the synchronism control circuit 205. The two laser beams 208 and 209 rotatively scan the area of a moving vehicle at low speed.

The laser beams 208 and 209 scanning the area are detected by the first and second photodetectors 203 and 204 and the vehicle-mounted photodetector 214.

The vehicle-mounted photodetector has quite the same structure as the first and second photodetectors shown in FIG. 16 and the output from the photodetection sensing circuit 214 is input to the photodetection angle sensing circuit 215.

The outputs 210 and 211 from the first and second photodetectors 203 and 204 are output to the reference azimuth sensing circuit. As shown in the timing chart in FIG. 18, pulses are generated at the corresponding reference azimuth sensing timings C1 and C2 at which the first and second photodetectors on the straight line connecting the points A' and B' are irradiated by the corresponding first and second projectors 201 and 202. In the reference azimuth sensing circuit, a signal 12 is generated in which a pulse having a pulse width Tc=C2−C1 or the interval between the reference azimuth sensing timings C1 and C2 for the first and second photodetectors appears every rotational synchronism T of the sensing means and output from the communication unit as a reference azimuth correction signal 13 to the vehicle-mounted communication unit 216.

Figure 18:
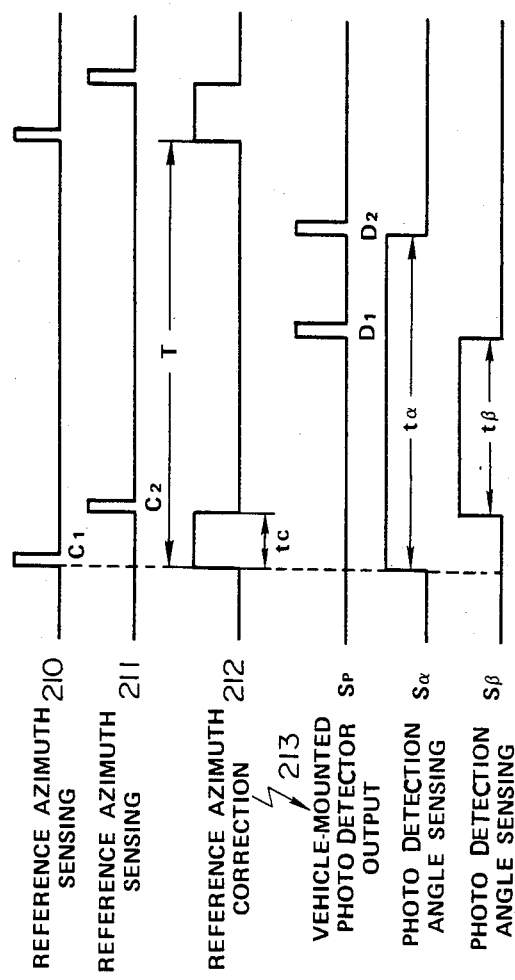
FIG. 18 is a timing chart for the apparatus.

The vehicle-mounted photodetector 214 detects laser beams from the first and second projectors 201 and 202, as shown by Sp in FIG. 18. The detection timings are as shown by Sb and generates pulses at the timings D1 and D2. These pulse outputs are output to the photodetection angle sensing circuit 215, which then outputs photodetection signals $S_{60}$, $S_{62}$ corresponding to the beams from the first and second projectors on the basis of the reference azimuth correction signal 13 input from the reference azimuth circuit via the communication unit 207 and vehicle-mounted communication device 216.

In this case, the actual timing difference from the time when the first photodetector has detected the first laser beam 208 to the time when the vehicle-mounted photodetector has detected the first laser beam 208 is sensed as a pulse width $t_{60}$ while the timing difference from the time when the second photodetector has detected the second laser beam 209 to the time when the vehicle-mounted photodetector has sensed the second laser beam 209 is obtained as a pulse width $t\beta$.

The photodetection angles $\alpha, \beta$ shown in FIG. 14 are calculated with high accuracy from these values $t\alpha$ and $t\beta$ as follows:

$$\alpha = 2\pi \times t_{60}/T, \beta = 2\pi \times t_{62}/T$$

In this way, the reference azimuths of the two projectors are detected by the corresponding photodetectors to correct a deviation, so that the relative error between the two reference azimuth signals, $\Delta\beta = 2\pi tc/T$, correction of which has been considered impossible in the conventional art, it corrected on a real-time basis to thereby improve the measurement accuracy.

The arithmetic and logic unit calculates the position of the moving vehicle from the photodetection angles $\alpha$, $\beta$, and the distance between the first and second projector means on the basis of the principles of a 3-point survey.

In this way, according to the third embodiment, a high-accuracy work vehicle measuring system for outdoor work, for example, in engineering and construction sites, is provided.

The rotations of laser beams from two laser projectors are not necessarily required to be synchronized. The position measuring accuracy can be greatly improved by sensing a rotational synchronism error between the two laser projectors using two photodetectors and correcting the relative error between both the reference azimuth signals on a real-time basis. In this manner, a high-accuracy work vehicle position measuring system for an outdoor work project, for example, in engineering and construction sites, is provided to thereby achieve an automated and unattended system for the project.

INDUSTRIAL APPLICATION

As described above, the present invention is useful as a position measuring system for a work vehicle operating in engineering and construction sites. The first to third embodiments are individually used and are effectively useful, and a combination of them would be more useful. For example, the position and attitude angle of a work vehicle can be sensed with very high accuracy, for example, by replacing the display of the second embodiment with that of the system of the first embodiment, and the position measuring unit of the third embodiment with that of the first embodiment.

We claim:

1. An apparatus for measuring the position of a moving body such as a vehicle, characterized by:
   first and second projector means installed at two preset fixed positions for projecting rotating laser beams, respectively, rotating at a fixed period;
   first, second and third photodetection means disposed on the moving body for detecting the photodetection timings with which laser beams are detected and photodetection height positions of the rotating laser beams;
   rotating angle calculating means for calculating first and second rotating angles of the rotating laser beams from the first and second projector means upon detection of the laser beams on the basis of the photodetection timings detected by the first photodetection means, third and fourth rotating angles of the rotating laser beams from the first and second projector means upon detection of the laser beams on the basis of the photodetection timings sensed by the second photodetection means, and fifth and sixth rotating angles of the rotating laser beams from the first and second projecting means upon detection of the laser beams on the basis of the photodetection timings detected by the third photodetector means;
   first calculating means for calculating a first, a second and a third coordinate positions, on a certain x-y-z-coordinate system, of the respective photodetection positions in the first, second and third photodetection means on the basis of the spacing between the first and second projector means, and the first and second rotating angles, third and fourth rotating angles and fifth and sixth rotating angles, calculated by the rotating angle calculating means; and
   second calculating means for calculating the longitudinal tilt angle, lateral tilt angle and azimuth of the moving body on the basis of the respective spacings among the first, second and third photodetection means, the photodetection height positions detected by the respective photodetection means and the first, second and third coordinate positions calculated by the first calculating means.

2. An apparatus for measuring the position of a moving body according to claim 1, including third calculating means for calculating the x-y-coordinate position of a point representative of the moving body on the basis of at least one of the photodetection height positions detected by the first, second and third photodetection means, at least one of the x-y-coordinate positions calculated by the first calculating means, and the longitudinal tilt angle, lateral tilt angle and azimuth of the moving body calculated by the second calculated means; and
   fourth calculating means for calculating the z-coordinate position of the point representative of the moving body on the basis of the z-coordinate position of the rotating laser beams, at least one of the photodetection height positions sensed by the first, second and third photodetection means, and the longitudinal tilt angle and lateral tilt angle of the moving body calculated by the second calculating means.

3. An apparatus for measuring the position of a moving body according to claim 2, wherein the first, second and third photodetection means are each a one-dimensional semiconductor position sensing unit standing at a predetermined position on the moving body.

4. An apparatus for measuring the position and attitude angle of a vehicle according to claim 2, including memory means for sequentially storing the calculated x-y-coordinate positions of the points representative of the vehicle, and map output means for creating and displaying a map on the basis of the x-y-z-coordinate positions stored in the memory means.

5. An apparatus for measuring the position of a moving body according to claim 4, wherein gthe memory means stores only the latest 3-dimensional positions when the 3-dimensional positions has the same x-y-coordinate positions.

6. An apparatus for measuring the position of a moving body, such as a construction vehicle operating in a construction site where work is to be done, comprising:
   3-dimensional position measuring means for sensing the position of the moving body;
   means for calculating a terrain of a construction work site on the basis of the 3-dimensional position information of the moving body from the 3-dimensional position measuring means, and converting the calculated terrain into height information of the terrain;
   memory means for storing the height information of the terrain output from the calculating means;
   display means for displaying the height information as map data on a display screen, rewriting the map data on the display screen on a real-time basis on the basis of the height information output at any time and indicating the current position of the moving body on the work site; and
   work control means for feeding back the height information as finish information of the work site to the moving body or an operator of the moving body.

* * * * *